Figure 1:
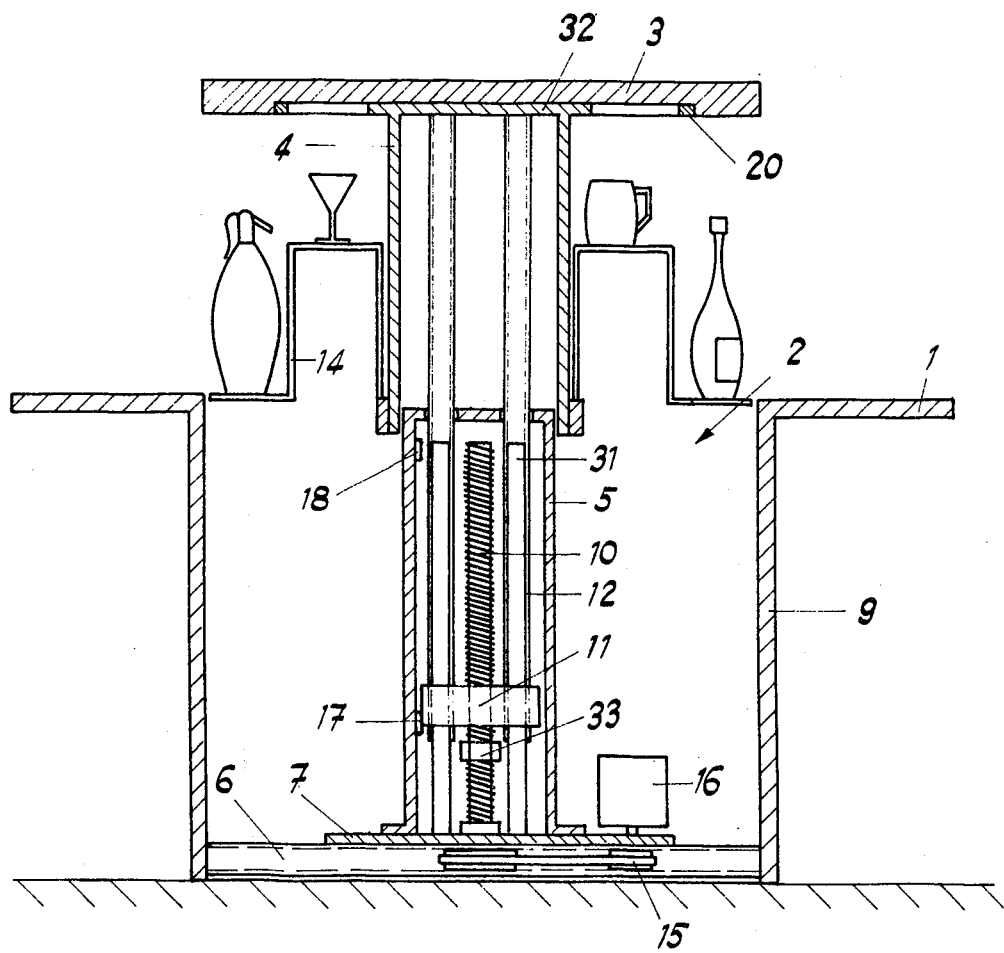

United States Patent [19]
Zollinger

[11] 3,932,009
[45] Jan. 13, 1976

[54] TABLE

[76] Inventor: Hansrudolf Zollinger, Zuercherstr. 72, Oberengstringen, Switzerland

[22] Filed: Mar. 1, 1974

[21] Appl. No.: 447,374

Related U.S. Application Data

[63] Continuation-in-part of Ser. No. 322,616, Jan. 11, 1973, abandoned.

[30] Foreign Application Priority Data
Jan. 11, 1972 Switzerland............ 356/72
Oct. 18, 1973 Switzerland........... 14737/73

[52] U.S. Cl............. 312/312; 108/147; 312/223
[51] Int. Cl.²............ A47B 9/04; A47B 9/20; A47B 51/00; A47B 77/18
[58] Field of Search............ 312/312, 135, 140.3; 108/93–96, 147

[56] References Cited
UNITED STATES PATENTS

| | | | |
|---|---|---|---|
| 2,249,455 | 7/1941 | Caldwell | 108/147 |
| 2,857,226 | 3/1957 | Schenk | 108/147 |
| 2,895,311 | 9/1956 | Spalvins | 312/312 |
| 3,065,037 | 11/1962 | Chapman | 312/312 |
| 3,416,849 | 12/1968 | Dube | 312/312 |

FOREIGN PATENTS OR APPLICATIONS
515,132  11/1952  Belgium............ 108/147

Primary Examiner—Paul R. Gilliam
Assistant Examiner—Carl F. Pietruszka
Attorney, Agent, or Firm—Roylance, Abrams, Berdo & Kaul

[57]  ABSTRACT

A table, especially a club table with a top surface having a central planch or surface portion which is movable with respect to the surrounding table top between a position in which it is flush with the surrounding table top and a position in which it is elevated above the surrounding surface. The central surface portion is supported and moved by a motor and a hoisting mechanism centrally disposed in the table, the region around the hoisting mechanism having storage shelves which are exposed when the planch is moved above the surrounding table top. Three embodiments of drive mechanisms are disclosed.

3 Claims, 3 Drawing Figures

TABLE

This application is a continuation in part of U.S. patent application Ser. No. 322,616, filed Jan. 11, 1973, and now abandoned.

The present invention refers to a table, especially a club table having a top surface in which a portion is movable between a flush position and a position elevated from the remainder of the table top surface.

The primary purpose of the present invention is to provide a table in which glasses, bottles and the like can be promptly supplied, even to serve a substantial number of individuals without the necessity of transporting these articles to the table at which they are to be used at the time when use is desired. The articles can be stored in the central portion of the table beneath the movable portion beforehand.

Briefly described, the invention includes a table having first and second top surface portions, means for supporting the first surface portion, means for supporting and moving the second surface portion between a normal position in which the first and second portions are flush and a second position in which the second surface portion is elevated above the first surface portion, and shelf means supported beneath the second surface portion, the means for supporting and moving the second surface portion being effective to elevate the second surface to a position in which the shelf means has a major surface flush with the first surface portion. The means for supporting and moving the second surface portion includes vertically extendible telescoping guide and drive means having one end connected to the second surface and the other end connected to the means for supporting the first surface portion so that relative movement between the two portions is obtained.

Figure 2:
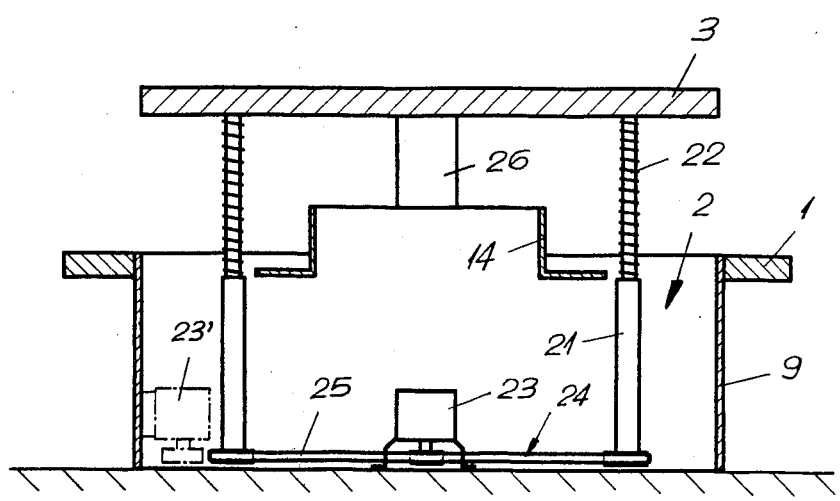
Figure 3:
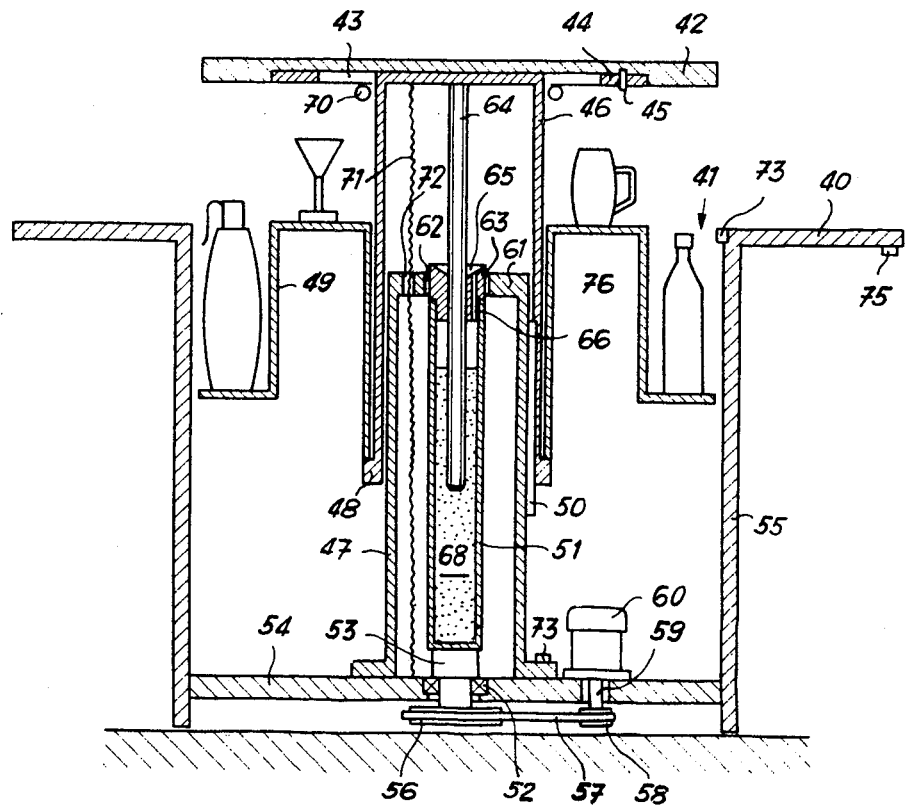

In order that the manner in which the purposes of the invention are attained can be understood in detail, reference is made to the accompanying drawings which form a part of the specification and wherein;

FIGS. 1–3 are vertical elevations, in partial section, showing three embodiments of tables in accordance with the invention.

In FIG. 1 there is shown a table having a first table top surface portion 1 which can be circular, rectangular or any other convenient shape. Surface portion 1 is provided with a central opening 2 which similarly can be circular or polygonal. A second surface portion 3 is disposed to rather closely fit in the opening 2, the second surface portion being mounted on a support 32 having a central portion and a radial spider extending to a rim 20 which closely fits a circular indentation in the underside of the second surface portion.

Support 32 is attached to, or integrally formed with, a depending cylindrical portion 4 which surrounds, in telescoping fashion, a cylindrical inner tube 5. Tube 5 is supported on and attached to a bottom plate 7 and a transverse support member 6 which is fixedly attached to vertical wall 9 supporting table top surface portion 1.

Telescoping members 4 and 5 form a housing within which is placed a further guide and drive means including an externally threaded spindle shaft 10 and a spindle nut 11 which is provided with an internally threaded central opening which mates with the threads of shaft 10. Two tubes 12 are fixedly connected to support member 32 and depend therefrom parallel with shaft 10 and are connected, near their lower ends, to spindle nut 11. Tubes 12 surround, in telescoping fashion, upwardly extending rods 31 which are attached to bottom plate 7, thereby preventing rotation of the second surface portion. However, spindle shaft 10 is rotatably mounted in bottom plate 7 and rotation thereof causes vertical motion of nut 11 which carries with it tubes 12 and the assembly including support 32 and surface 3. The bottom end of spindle 10 is provided with a pulley wheel which is coupled to and driven by an electrical motor 16 by a belt 15 of conventional type. The spindle is provided with a stop nut 33 to limit the downward motion of the table to a level at which the surfaces are flush.

The apparatus can also be provided with limit switches 17 and 18 to denote specific levels at which the vertical motion of surface 3 is to be stopped.

A shelf structure 14 is mounted on and supported by depending cylindrical portion 4 of support 32, the shelf structure being rotatably mounted thereon in the manner of a "lazy susan" so that various objects can be stored on the shelves and so that they can be easily reached from all sides of the table. Shelf 14 can be elevated to a level at which a major horizontal surface portion thereof is flush with first table top surface portion 1.

Turning now to FIG. 2, it will be seen that a similar table structure is provided but that the specific drive therefore is somewhat modified. Again, first and second surface portions 1 and 3 are provided and surface 3 is relatively movable. The interior shelf 14 is supported from surface portion 3 by a cylindrical member 26 which may provide for rotatably mounting of shelf 14.

The elevating mechanism in the embodiment of FIG. 2 includes four externally threaded spindle shafts 22 depending from the undersurface of surface portion 3. Only two of these spindles are visible in the view of FIG. 2 because of the sectioning. The spindles threadedly mate with interior threads within tubes 21 which extend upwardly from the support means for the table and which are rotatably mounted thereon. The spindle shafts themselves are nonrotatably mounted in surface 3. Tubes 21 are provided with pulley wheels which are coupled to, and driven by, a motor 23 which has a similar pulley wheel and which engages belts 25 of a conventional belt drive 24. The belts, which are shown schematically, can be toothed belts. All spindle tubes, which have the equivalent of spindle nuts therein, are thus simultaneously driven, causing the spindles and the surface portion 3 to elevate.

It will be observed that the motor 23' shown in phantom in FIG. 2, can be mounted on support walls 9 to provide greater flexibility in the construction of shelf 14. It will also be observed that the relative position of the spindles and tubes can be exchanged so that the tubes are connected to surface 3 and the spindles are rotatably mounted.

In FIG. 3 is shown a further embodiment in accordance with the invention, this embodiment incorporating improved features particularly as to lubrication. In the previously disclosed embodiment a disadvantage is that the threaded spindles are relatively inaccessible and, depending upon factors such as the environment and the size and weight of the table, the spindle is not sufficiently lubricated after an interval of use. Such lack of lubrication can lead to wear of parts resulting in defective behavior and disturbing noise.

In this embodiment the main table top portion 40 is provided with a central opening indicated generally at 41 into which a movable portion 42 will fit. The movable surface portion is provided with a recess 43 into which fits a support member 44, which support is secured to the table portion 42 by a pin 45.

Support 44 is attached to, or integrally formed with, a depending cylindrical tube 46 which surrounds an upwardly extending cylindrical tube 47 in telescoping relationship. An annular flange 48 extends upwardly from the lower end of tube 46 and supports a shelf structure 49 on which various articles can be stored. Shelf structure 49 can be provided with suitable bearing surfaces to render it rotatable.

Tubes 46 and 47 can be interrelated by a conventional slot and key 50 to prevent relative rotation of the table top 42 with respect to tube 47 and, hence, table top 40, the purpose of this arrangement being to maintain alignment of any pattern or design which may be provided on the exposed upper surfaces of the table tops, or to maintain proper orientation of a non-circular center portion.

Within tube 47 is a substantially smaller tube 51 which is rotatably supported on a journal 52 and shaft 53 which passes through a bottom plate 54 of the table structure. Plate 54 is connected to upstanding walls 55 which support table top 40. Tube 51 is thus freely rotatable and is provided with a pulley wheel 56 at its lower end, the pulley wheel being driven by a belt 57 which is, in turn, driven from a pulley wheel 58 on the end of output shaft 59 which is powered by an electric motor 60.

The upper end of tube 47 is provided with an end wall 61 which has a central opening 62. A spindle nut 63 is mounted in the upper end of tube 51 to be rotatable therewith, spindle nut 63 extending through opening 62 in wall 61. A spindle 64 is attached to support 44 and extends downwardly in threaded engagement with spindle nut 63. Thus, rotation of tube 51 by motor 60 causes rotation of spindle nut 63 and vertical movement of spindle 64, carrying with it table top portion 42.

The spindle nut is provided with a conical recess 65 and a vertical opening 66 which passes through the spindle nut from the recess to the lower surface thereof.

The lower surface of spindle nut 63 and the interior of tube 51 forms a substantially closed chamber, except for opening 66, which can be filled or nearly filled with a suitable lubricant 68 into which the lower portion of spindle 64 extends. Thus, each time the table top is lowered spindle 64 extends downwardly into the reservoir of lubricant 68 and becomes coated thereby. When the spindle again passes upwardly through the spindle nut, some lubricant passes with it and can run downwardly to the spindle nut. The conical beaker-like recess 65 accumulates this excess lubricant and a major portion thereof is permitted to pass through opening 66 to the reservoir. However, a small amount is retained in the recess to additionally lubricate the portion of the spindle which is above that point as the table top is lowered. This is particularly important if the table top is permitted to remain in its uppermost position for an extended period of time.

The embodiment shown in FIG. 3 also includes a circular neon light 70 which is disposed immediately beneath support 44 and surrounding tube 46 to illuminate the articles stored on shelf structure 49. Electrical conductors 71 pass upwardly through tube 46 and through an opening 72 in wall 61 and to a source of power to energize the light. The conductors can conveniently be passed through lower wall 54 of the table structure, but these connections are not shown. Motor 60 is energized. Also provided are limit switches 73 and 74 to limit the upper and lower extent of movement of the movable portion of the table structure. A control switch 75 can be provided to initiate operation of the elevating mechanism. It will be observed that the specific configuration of shelf structure 49 as illustrated in FIG. 3 permits the storage of tall articles on the lower shelves but also provides a cavity 76 into which motor 60 will pass when the shelf is completely lowered. Thus, sufficient storage of both low and high articles is provided.

While certain advantageous embodiments have been chosen to illustrate the invention, it will be understood by those skilled in the art that various changes and modifications can be made therein without departing from the scope of the invention as defined in the appended claims.

I claim:

1. A table particularly of the type known as a club table, comprising the combination of first and second top surface portions;

means for supporting said first surface portion including upstanding support walls and a horizontal member extending between said walls;

means for supporting and moving said second surface portion between a normal position in which said first and second portions are flush and a second position in which said second surface portion is elevated above said first surface portion;

shelf means supported beneath said second surface portion, said means for supporting and moving being effective to elevate said second surface portion to a position in which said shelf means has a major surface flush with said first surface portion;

said means for supporting and moving said second surface comprising first and second telescoping guide tubes, said first tube depending from said second portion and surrounding said second tube, said shelf means being supported on said first tube;

means for preventing relative rotation between said guide tubes; and vertically extendible telescoping guide and drive means, substantially surrounded by said second tube, and having one end connected to said second surface and the other end connected to said means for supporting said first surface portion for elevating said second surface portion, said telescoping guide and drive means further comprising a tube mounted for rotation in said horizontal member, said tube comprising a lubricant reservoir substantially filled with lubricant;

a spindle nut mounted on said tube for rotation therewith, said nut having an internally threaded central opening;

an externally threaded spindle depending from said second surface portion and engaging said opening in said spindle nut; and means for rotating said tube.

2. A table according to claim 1 wherein the upper surface of said spindle nut is frustro-conical in shape, forming a reservoir surrounding said central opening;

and said nut further includes a drain opening for returning lubricant to said reservoir.

3. A table according to claim 1 in which first and second guide tubes of said means for supporting and moving further includes key and slot means for preventing rotation of said second surface portion relative to said first surface portion.

* * * * *